(12) United States Patent
Plank et al.

(10) Patent No.: US 10,944,474 B2
(45) Date of Patent: Mar. 9, 2021

(54) DUAL-MODE OPTICAL DEVICES FOR TIME-OF-FLIGHT SENSING AND INFORMATION TRANSFER

(71) Applicant: Infineon Technologies AG, Neubiberg (DE)

(72) Inventors: Hannes Plank, Graz (AT); Norbert Druml, Graz (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/849,683

(22) Filed: Apr. 15, 2020

(65) Prior Publication Data

US 2020/0244358 A1 Jul. 30, 2020

Related U.S. Application Data

(62) Division of application No. 16/007,086, filed on Jun. 13, 2018, now Pat. No. 10,630,384.

(51) Int. Cl.
| | |
|---|---|
| *H04B 10/079* | (2013.01) |
| *G01S 17/06* | (2006.01) |
| *H04B 10/071* | (2013.01) |
| *H04B 10/114* | (2013.01) |
| *H04J 14/08* | (2006.01) |
| *G06K 9/00* | (2006.01) |

(Continued)

(52) U.S. Cl.
CPC ........ *H04B 10/07953* (2013.01); *G01S 17/06* (2013.01); *H04B 10/071* (2013.01); *H04B 10/1143* (2013.01); *H04B 10/5561* (2013.01); *H04J 14/08* (2013.01); *G06K 9/00671* (2013.01); *H04B 10/40* (2013.01); *H04B 10/43* (2013.01); *H04B 10/50* (2013.01); *H04B 10/60* (2013.01)

(58) Field of Classification Search
None
See application file for complete search history.

(56) References Cited

U.S. PATENT DOCUMENTS

| | | | |
|---|---|---|---|
| 6,198,528 | B1 | 3/2001 | Maynard |
| 9,118,435 | B2 | 8/2015 | Chow et al. |

(Continued)

FOREIGN PATENT DOCUMENTS

| | | |
|---|---|---|
| DE | 102017126378 A1 | 5/2019 |
| DE | 102017128369 A1 | 6/2019 |

OTHER PUBLICATIONS

Plank, Hannes, et al., "High-performance Indoor Positioning and Pose Estimation with Time-of-Flight 3D Imaging", European Union, 2017, pp. 1-8.

*Primary Examiner* — Darren E Wolf
(74) *Attorney, Agent, or Firm* — Murphy, Bilak & Homiller, PLLC

(57) ABSTRACT

Exemplary embodiments include a dual-mode optical device having an optical reflector, an optical transmitter, and a detector. The optical reflector is configured to reflect an incident first optical signal having a first wavelength, wherein the first optical signal includes a plurality of intermittent active and inactive durations. The optical transmitter is configured to emit a second optical signal having a second wavelength substantially similar to the first wavelength. The detector is configured to: determine the active and inactive durations of the first optical signal; and inhibit the optical transmitter from emitting the second optical signal during the detected active durations of the first optical signal.

13 Claims, 11 Drawing Sheets

(51) Int. Cl.
*H04B 10/40* (2013.01)
*H04B 10/43* (2013.01)
*H04B 10/50* (2013.01)
*H04B 10/60* (2013.01)
*H04B 10/556* (2013.01)

(56) References Cited

U.S. PATENT DOCUMENTS

| | | |
|---|---|---|
| 9,915,528 B1 | 3/2018 | Solh |
| 2001/0005830 A1 | 6/2001 | Kuroyanagi |
| 2005/0046584 A1 | 3/2005 | Breed |
| 2013/0293413 A1 | 11/2013 | Robinson |
| 2014/0237366 A1 | 8/2014 | Poulos et al. |
| 2014/0313376 A1 | 10/2014 | Van Nieuwenhove et al. |
| 2015/0181099 A1 | 6/2015 | Van Der Tempel et al. |
| 2016/0353989 A1 | 12/2016 | Sebastian et al. |
| 2017/0094248 A1 | 3/2017 | Kashyap |
| 2018/0005176 A1 | 1/2018 | Williams et al. |

DUAL-MODE OPTICAL DEVICES FOR TIME-OF-FLIGHT SENSING AND INFORMATION TRANSFER

TECHNICAL FIELD

The present disclosure relates generally to methods, systems, and devices usable for localizing (e.g., determining a position of), and transferring information from, other devices using a plurality of optical signals (e.g., infrared signals) having substantially similar wavelengths.

BACKGROUND

In many fields (e.g. Internet of Things, IoT, smart homes, or Wireless Sensor Networks, WSN), location-awareness for embedded devices is desired or even crucial. Such small electronic devices, however, are usually unable to determine their own location due to restrictions in size, cost, and/or power consumption. Conventional location-determination (also referred to herein as positioning and localization) techniques using Radio Frequency (RF) signals, audio signals, or magnetic signals are severely limited in accuracy, range, or both.

Further, the complexity of 3D motion tracking and indoor positioning is problematic. Devices in the fields of industrial automation, autonomous robotics, augmented reality (AR), and virtual reality (VR) currently rely on complex systems, such as described above, for positioning. This hinders the development of ubiquitous location-aware devices. Conventional systems, e.g., use combinations of ToF sensors, wide-angle motion tracking cameras, inertial sensors and a dedicated computer vision processor. This results in complex systems with excessive cost, size, and/or power consumption. Similarly, the association of stationary electronic devices with geometric positions is problematic. Even if the expected positions are known, it can be labor-intensive to manually determine which device is located at which position.

New approaches involving image-sensor-based localization and tracking systems have been proposed. These systems can be sufficiently accurate to determine the position and orientation of electronic devices. More specifically, these systems often use Time-of-Flight (ToF) three-dimensional sensors in combination with small reflective markers (also referred to as "tags" or "devices"). Such systems can determine the position and orientation of a device at a rate of several hundred times per second (Hz).

Even though such systems provide accurate localization, the simplicity of reflective tags severely limits the possibility of further interaction, which is important for many of the applications mentioned above. For example, interaction is especially important for AR/VR applications. In other words, such systems generally require another transmission system (e.g., an RF communication system, such as Bluetooth) between the device the sensor to facilitate the information transfer needed for interaction. Much like the positioning systems described above, these systems can introduce unwanted complexity, cost, size, and/or power consumption.

SUMMARY

Accordingly, to address at least some of such issues and/or problems, certain exemplary embodiments of the present disclosure include optical devices that are capable of reflecting first optical signals emitted by compatible optical sensing systems (e.g., ToF measurement systems), and transmitting second optical signals bearing information related to the optical device or an associated object (e.g., a device or object identity, user interface (UI) to the object, etc.). The first and second optical signals can have a substantially similar wavelength (e.g., infrared), and the optical device can reflect and transmit the optical signals in a time-multiplexed (e.g., time-synchronized) manner, such that the second (information-bearing) optical signals do not interfere with first optical signal used for ToF measurements. When used with optical sensing system embodiments disclosed herein, these arrangements facilitate improved interaction with persons, devices, objects, etc. in a user's environment. These improvements can be particularly advantageous in AR and VR applications, as explained further below.

Exemplary embodiments of the present disclosure include methods and/or procedures for receiving, in a time-multiplexed manner, a plurality of optical signals having substantially similar wavelengths. The exemplary methods and/or procedures can include emitting a first optical signal having a first wavelength and comprising a plurality of intermittent active and inactive durations. The exemplary methods and/or procedures can also include receiving, during one or more of the active durations, a reflected version of the first optical signal and performing a time-of-flight (ToF) measurement based on the first optical signal and the reflected version of the first optical signal. The exemplary methods and/or procedures can also include receiving, only during one or more of the inactive durations of the first optical signal, a second optical signal having a second wavelength substantially similar to the first wavelength of the first optical signal.

In some embodiments, exemplary methods and/or procedures can be performed by a time-of-flight (TOF) measurement device. In some embodiments, the reflected version of the first optical signal and the second optical signal can be received from a single optical device. In some embodiments, the first and second wavelengths can be associated with infrared light.

In some embodiments, the exemplary methods and/or procedures can also include determining a location of the optical device based on the ToF measurement, and retrieving, from the received second optical signal, information encoded in said received second optical signal. In some embodiments, the second optical signal can include information encoded based on phase-shift keying (PSK) modulation, and retrieving the information can include demodulating the PSK-encoded information.

In some embodiments, the exemplary methods and/or procedures can also include determining a relative signal strength of at least one of: the received reflections of the first optical signal and the received second optical signal; and determining the location of the optical device further based on the determined relative signal strength and a correlation function between the first optical signal and the reflected version of the first optical signal. In some embodiments, the exemplary methods and/or procedures can also include transmitting information identifying one or more of: at least one of an active duration and an inactive duration of the first optical signal; and an identifier of the optical device.

Other exemplary embodiments of the present disclosure include an optical sensing system arranged to receive, in a time-multiplexed manner, a plurality of optical signals having substantially similar wavelengths. The optical sensing system can include an optical transmitter configured to emit a first optical signal having a first wavelength and comprising a plurality of intermittent active and inactive durations. The optical sensing system can also include an optical sensor configured to: receive, during one or more of the active durations, a reflected version of the first optical signal; and receive, only during one or more of the inactive durations of the first optical signal, a second optical signal having a second wavelength substantially similar to the first wavelength of the first optical signal. The optical sensing system can also include a one or more processing circuits configured to perform a time-of-flight (ToF) measurement based on the first optical signal and the reflected version of the first optical signal.

In some embodiments, the optical sensor and the one or more processing circuits comprise a time-of-flight (ToF) measurement device. In some embodiments, the reflected version of the first optical signal and the second optical signal can be received from a single optical device. In some embodiments, the first and second wavelengths can be associated with infrared light.

In some embodiments, the one or more processing circuits and the optical sensor can be further configured to cooperatively: determine a location of the optical device based on the ToF measurement; and retrieve, from the received second optical signal, information encoded in said received second optical signal. In some embodiments, the second optical signal can include information encoded based on phase-shift keying (PSK) modulation, and retrieving the information can include demodulating the PSK-encoded information.

In some embodiments, the one or more processing circuits and the optical sensor can be further configured to cooperatively determine a relative signal strength of at least one of: the received reflections of the first optical signal, and the received second optical signal. In some embodiments, the one or more processing circuits can be configured to determine the location of the optical device further based on the determined relative signal strength and a correlation function between the first optical signal and the reflected version of the first optical signal.

In some embodiments, the optical sensing system can also include a transmitter configured to transmit information identifying one or more of: at least one of an active duration and an inactive duration of the first optical signal; and an identifier of the optical device. In some embodiments, the transmitter can be one of an optical transmitter and a radio frequency (RF) transmitter.

Other exemplary embodiments of the present disclosure include a dual-mode optical device comprising an optical reflector configured to reflect an incident first optical signal having a first wavelength, wherein the first optical signal comprises a plurality of intermittent active and inactive durations. The optical device also includes an optical transmitter configured to emit a second optical signal having a second wavelength substantially similar to the first wavelength. The optical device also includes a detector configured to determine the active and inactive durations of the first optical signal, and inhibit the optical transmitter from emitting the second optical signal during the detected active durations of the first optical signal.

In some embodiments, the first and second wavelengths can be associated with infrared light. In some embodiments, the detector can comprise an optical detector configured to detect at least one of: energy of the first optical signal; and a transmission pattern of the first optical signal. In some embodiments, the detector can be further configured to enable the optical transmitter to emit the second optical signal during the detected inactive durations of the first optical signal.

In some embodiments, the optical transmitter can be further configured to encode information in the second optical signal. In some embodiments, the information can include one or more of: an identifier (ID) of the optical device; information pertaining to an operating parameter of the optical device; and information pertaining to a user interface (UI) of an object associated with the optical device. In some embodiments, the optical transmitter can be configured to encode information using phase-shift keying (PSK) modulation.

In some embodiments, the dual-mode optical device can also include a receiver configured to receive information identifying one or more of: at least one of an active duration and an inactive duration of the first optical signal; and an identifier of the dual-mode optical device. In some embodiments, the receiver can be one of an optical receiver and a radio frequency (RF) receiver.

Other exemplary embodiments of the present disclosure include methods and/or procedures for facilitating user interaction with an object associated with an optical device. The exemplary methods and/or procedures can include emitting a first optical signal having a first wavelength and comprising a plurality of intermittent active and inactive durations. The exemplary methods and/or procedures can also include receiving, during one or more of the active durations, a reflected version of the first optical signal. The exemplary methods and/or procedures can also include receiving, only during one or more of the inactive durations of the first optical signal, a second optical signal having a second wavelength substantially similar to the first wavelength of the first optical signal.

The exemplary methods and/or procedures can also include determining a location of at least one of the optical device and the object, based on the first optical signal and the received reflected version of the first optical signal. In some embodiments, determining the location can include performing a time-of-flight (ToF) measurement based on the first optical signal and the reflected version of the first optical signal; and determining the location based on the ToF measurement. In some embodiments, determining the location of at least one of the optical device and the object can include determining the location relative to an optical sensing system that performs the emitting and receiving operations. In some embodiments, determining the location relative to the optical sensing system can be further based on a correlation function between the first optical signal and the reflected version of the first optical signal, and a relative signal strength of at least one of: the received reflected version of the first optical signal; and the received second optical signal.

The exemplary methods and/or procedures can also include determining a user interface associated with the object based on the location and information encoded in the second optical signal. In some embodiments, determining the user interface associated with the object can be based on the location relative to the optical sensing system. In some embodiments, determining the user interface associated with the object can include retrieving user-interface information from a record in a database, the record being associated with the information encoded in the second optical signal.

In some embodiments, the exemplary methods and/or procedures can also include capturing images of a field of view using a camera, the field of view including the object. In some embodiments, the exemplary methods and/or procedures can also include rendering the user-interface information associated with the object on a display. For example, the user-interface information can be rendered together with the captured images in a region of the display that corresponds to a position of the object in the field of view. In some embodiments, the exemplary methods and/or procedures can also include receiving user input associated with the object.

In some embodiments, the reflected version of the first optical signal and the second optical signal can be received from a single optical device. In some embodiments, the exemplary methods and/or procedures can be performed by a time-of-flight (TOF) measurement device. In some embodiments, the first and second wavelengths can be associated with infrared light.

These and other aspects, features, and advantages will become apparent upon reading the following detailed description of the exemplary embodiments of the present disclosure, when taken in conjunction with the appended claims.

BRIEF DESCRIPTION OF THE FIGURES

The elements of the drawings are not necessarily to scale relative to each other. Like reference numerals designate corresponding similar parts. The features of the various illustrated embodiments may be combined unless they exclude each other. Embodiments are depicted in the drawings and are detailed in the description which follows.

DETAILED DESCRIPTION

Figure 1:
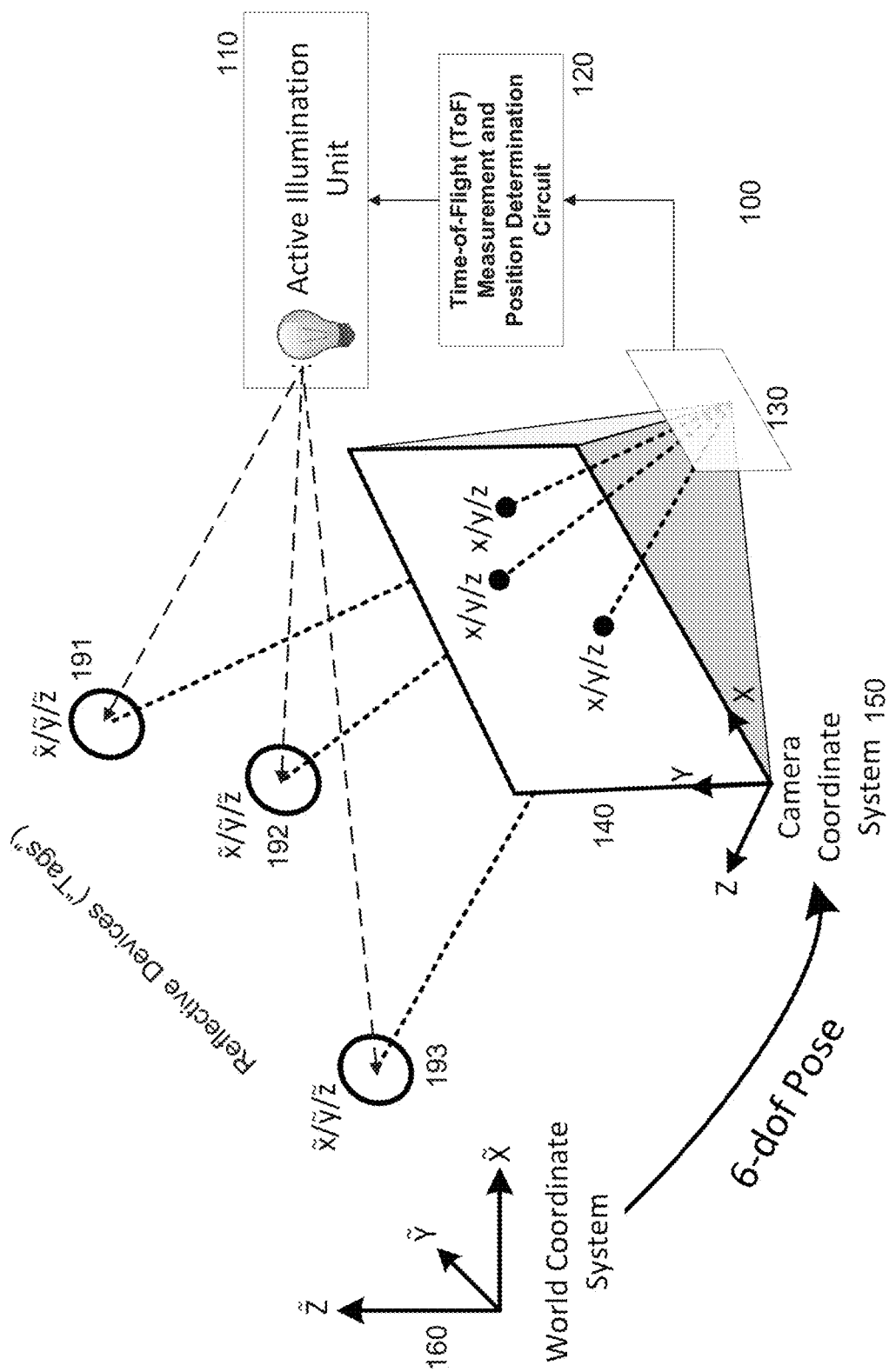
FIG. 1 illustrates a system usable for position determination of one or more optical devices (e.g., reflective tags) based on time-of-flight (ToF) measurements.

FIG. 1 illustrates a system 100 usable for position determination of one or more optical devices (e.g., reflective tags) based on time-of-flight (ToF) measurements. As shown in FIG. 1, system 100 comprises an active illumination unit 110 (e.g., a light source) configured to emit modulated light signals. The light signals can have a first wavelength, e.g., in an infrared band. The light signals can be emitted over a range of azimuths and elevations such that they are incident on devices 191, 192, and 193, each of which has a different 3-D position $\{\tilde{x}\ \tilde{y}\ \tilde{z}\}$ in a coordinate system 160. Coordinate system 160 can be a global coordinate system, or a coordinate system established relative to a particular object or landmark (e.g., a building or a room).

Each of devices 191-193 can reflect the emitted light signals, such that reflected versions of the light signals pass through an optical apparatus, which can comprise one or more lenses. Optical apparatus 140 can be configured to project the reflected light signals on an image sensor 130. The combination of the optical apparatus 140 and image sensor 130 can be referred to as a "ToF camera", which has an associated camera coordinate system 150. As shown in FIG. 1, the origin of camera coordinate system 150 is established with respect to optical apparatus 140, such that each of the reflected light signals is incident on the optical apparatus 140 at a different 3-D position $\{x\ y\ z\}$ in camera coordinate system 150. If, alternately, the origin were established with respect to the image sensor 130, the respective 3-D positions $\{x\ y\ z\}$ of the reflected light signals would be with respect to that established origin.

Image sensor 130 can comprise an array of photosensitive pixels configured to receive modulated light signals and convert them into electrical signals. These electrical signals can be read from the image sensor by a ToF measurement and position determination circuit 120. Circuit 120 can comprise, e.g., one or more processing circuits that can be any combination of analog/digital hardware, processors, and non-transitory media (e.g., memories) storing processor-executable instructions. As shown in FIG. 1, circuit 120 also controls light source 110, more specifically the timing and the phase the light signal emissions from source 110. Based on the known information about the emitted signals and information collected from the image sensor 130, circuit 120 can determine (e.g., estimate the actual) respective 3-D positions $\{x\ y\ z\}$, in camera coordinate system 150, of the light signals reflected from devices 191-193.

For example, circuit 120 can be configured to determine a distance from system 100 (e.g., from image sensor 140 and/or optical apparatus 130) to the device 191 (and, alternately, also devices 192-193) based on a measured time-of-flight (ToF) of the emitted signal. The measured ToF is based on the known characteristics of the emitted light signal and the reflection. Further, processing circuit 120 can be configured to determine an angle of arrival of the reflected signals, and thereby estimate the respective positions of device 191 in camera coordinate system 150.

In some embodiments, circuit 120 can also be configured to determine the position and the orientation of apparatus 100 in the coordinate system 160. For example, this functionality of circuit 120 can comprise one or more of a 2-D camera, orientation and/or motion sensors, global navigation and positioning system (GLASS, e.g., GPS), positioning based on communication with other devices (e.g., based on cellular base station and/or WiFi Access Point ID), etc. In some embodiments, system 100 can be stationary, such that the stationary position and/or orientation of system 100 can be stored in a memory comprising circuit 120.

In any case, circuit 120 is further configured to determine the position of device 191 (and, alternately, devices 192-193) in coordinate system 160 based on the determined position of device 191 in camera coordinate system 150 and the determined position and/or orientation of system 100 in coordinate system 160. This can be performed, e.g., using one or more rotations to account for the orientation of system 100 in coordinate system 160, as well as one or more translations to account for the position of system 100 in coordinate system 160. Such translations and rotations can be performed, e.g., using matrix operations known to skilled persons.

Figure 2:
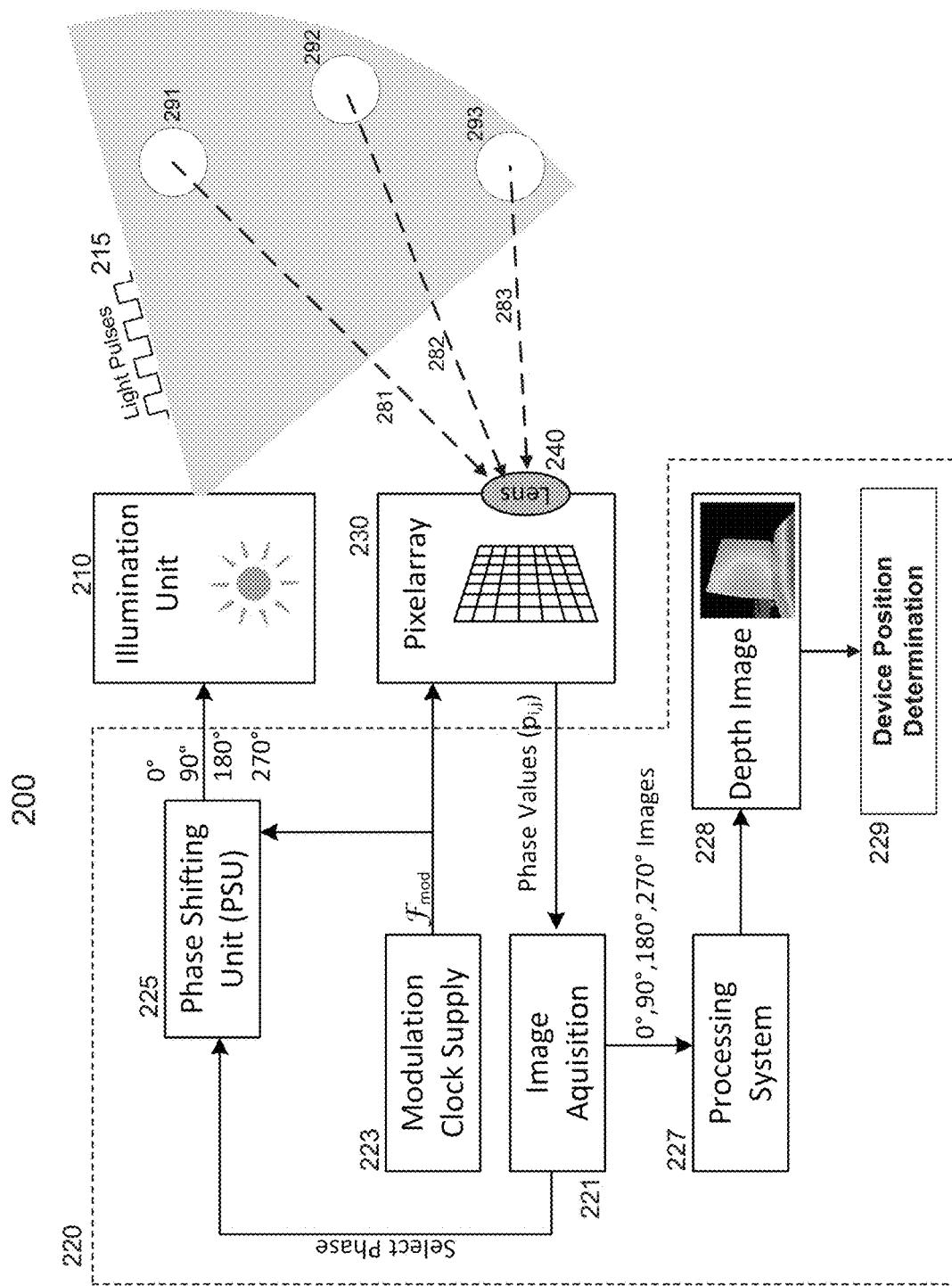
FIG. 2 illustrates another system usable for position determination of one or more optical devices (e.g., reflective tags) based on ToF measurements.

FIG. 2 illustrates another optical system usable for position determination of one or more devices (e.g., reflective tags) based on ToF measurements. For the sake of simplicity and without limitation, the system shown in FIG. 2 can be seen as another view of system shown in FIG. 1, so that similar elements are given similar numbers. However, FIG. 2 shows certain elements in more detail, using numbers different than used in FIG. 1.

As shown in FIG. 2, the optical system includes an optical sensing system 200 and a plurality of devices 291-293. Optical sensing system 200 includes an illumination unit 210 that emits a series of light pulses 215. These are emitted over a range of azimuths and elevations, denoted with the shaded cone in FIG. 2, such that they illuminate various reflective devices (or tags) 291-293. Each of devices 291-293 reflect light pulses 215 such that the reflections are incident on lens 240, which is configured to project the reflected light pulses on an image sensor 230. Since the devices 291-293 are at different positions relative to light pulses 215, the reflected light pulses will appear at different pixels within the pixel array comprising image sensor 230.

System 200 also includes ToF measurement and position determination circuit 220, which itself comprises various circuits and/or functional units. For example, circuit 220 includes image acquisition circuit 221, which reads the pixel values after image sensor 230 has converted the received optical energy into per-pixel electrical signals. Image acquisition circuit 221 also controls a phase-shifting unit (PSU) 225, by which it can control the phase of the light pulses 215 emitted by illumination unit 210. For example, image acquisition circuit 221 can configure, via PSU 225, illumination unit 210 to emit a series of four groups of light pulses, each group having one or more pulses that are shifted 90 degrees relative to the pulses of the immediately preceding group. For example, the four groups of pulses can have phases of 0, 90, 180, and 270 degrees. The timing and/or phases of the various groups of pulses can be further controlled by modulation clock supply circuit 223, which also supplies the timing (e.g., clock signal) used for reading the pixel values from image sensor 230.

In this manner, image acquisition circuit 221 can capture a series of four images, each corresponding to one of the four emitted light phases of 0, 90, 180, and 270 degrees. Further exemplary principles of operation are described as follows. Due to the travel time, the phase of the reflected pulsed light signal is shifted. This phase-shift can be measured by a photonic mixer device (PMD) located on each pixel of the sensor 230. For example, when photons arrive at the pixel, the PMD transfers the generated charges into either of two capacitors—A or B—associated with each pixel. Whether the charges are stored in A or B is controlled by the signal Fmod generated by clock supply circuit 223, which determines the frequency of the emitted light pulse. This signal is also provided to each pixel comprising sensor 230, and controls the reading of the voltages (A and B) associated with each pixel. The difference between the two voltages is related to the per-pixel phase value, p, which is read for each pixel by image acquisition circuit 221.

Although p is related to the distance to the reflecting device, it also depends on the amount of reflected light. Since each material reflects light differently, it can be necessary to normalize these effects. An exemplary way to calculate the actual phase offset $\phi$ is by using the four-phase approach discussed above, thereby capturing four different images of the same scene, based on emitted light pulses shifted by 0, 90, 180, and 270 degrees. These images are provided to a processing system 227, which combines the four images into a depth image 228. Based on the de, from which the actual phase offset $\phi$ can be determined, Since actual phase offset $\phi$ is proportional to the ToF of the emitted light signal, the distance between the device and the sensor can be determined using the light modulation frequency f and the speed of light c. By combining the distance with the position of the reflected light source on the pixel array, determined from the depth image 228, the position of the reflecting device in the camera coordinate system can be determined by device position determination circuit 229. Furthermore, circuit 229 can determine the position of the reflecting device in a world coordinate system according to the methods discussed above in relation to FIG. 1.

According to this measurement principle, the phase values are directly influenced only by pulsed infrared light within a certain frequency interval. Continuous light sources such as lamps or sunlight typically do not produce a signature in either the phase or the depth images.

AR devices such as smartphones or head-mounted devices (HMD) are becoming increasingly available to the public. Some of these include a ToF measurement circuitry operating according to principles described above with respect to FIGS. 1-2. In such applications, ToF measurement circuitry is often used for user input (e.g., gesture) detection and 3D scanning. If an AR device today wants to provide augmented information at a certain location, it needs to know its own position and orientation. This information is only available at locations which feature an indoor positioning system, or reference data.

Furthermore, current AR devices are limited in their connectivity to other electronics. With traditional methods, such as Wi-Fi or Bluetooth, the location of a communication partner is generally known only to an accuracy and/or resolution of 1-100 meters. This coarse location information prevents embedding and/or overlaying information and interaction possibilities with other devices and/or objects that appear in the AR field of view.

Exemplary embodiments of the present disclosure further extend the principles discussed above to provide devices that are capable of reflecting first optical signals emitted by sensing devices (e.g., ToF measurement devices), and transmitting second optical signals comprising information associated with the device, e.g., a device identity, user interface (UI) to an object associated with the device, etc. Such information can facilitate user interaction with the object, e.g., in AR and VR applications.

The first and second optical signals can have substantially similar wavelengths; for example, both signals can be infrared signals. As such, the device can be configured to reflect the first optical signal and transmit the second optical signal in a time-multiplexed manner, such that the second optical signal does not interfere with ToF measurements on the first optical signal. For example, the device can control the time-multiplexing by detecting active and/or inactive durations of the emitted first optical signal, and inhibiting and enabling the transmission of the second optical signal, respectively. In other embodiments, the device can receive, from the ToF measurement device, information identifying the active and/or inactive durations.

Exemplary embodiments of the present disclosure also include optical sensing systems that are capable of emitting first optical signals usable for ToF measurement, receiving versions of the first optical signals reflected by a device, performing ToF measurements based on characteristics of the first optical signal and the reflected versions, and receiving second optical signals comprising information associated with the device, e.g., a device identity, user interface (UI) to an object associated with the device, etc.

The first and second optical signals can have substantially similar wavelengths; for example, both signals can be infrared signals. As such, the optical sensing system can be configured to transmit the first optical signal and receive the second optical signal in a time-multiplexed manner, such that the second optical signal does not interfere with ToF measurements on the first optical signal. In some embodiments, the optical sensing system can control the time-multiplexing by sending, to the device, information identifying the active and/or inactive durations of the first optical signal. In other embodiments, as discussed above, the device can transmit in a time-multiplexed manner based on detecting active and/or inactive durations of the emitted first optical signal.

Figure 3:
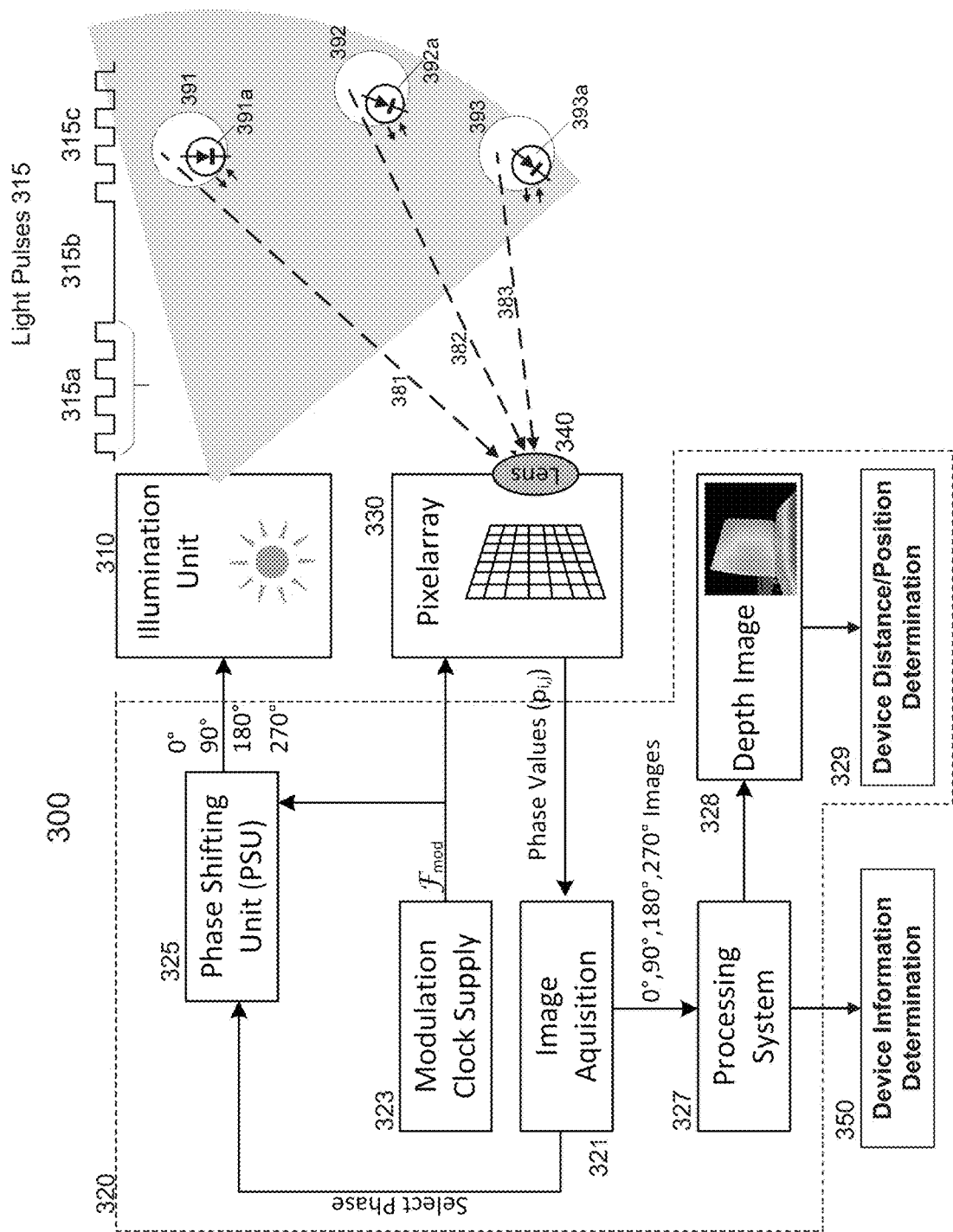
FIGS. 3-4 illustrate an exemplary optical system usable for ToF measurement and information transfer, according to various exemplary embodiments of the present disclosure.

FIG. 3 illustrates an exemplary optical system configurable for ToF measurement and information transfer, according to various exemplary embodiments of the present disclosure. The system shown in FIG. 3 can be seen as an augmented version of the system shown in FIG. 2, so that similar elements are given similar numbers (e.g., last two digits are the same). However, FIG. 3 shows certain additional elements, which are given numbers different than those used in FIG. 1.

As shown in FIG. 3, the optical system includes an optical sensing system 300 and a plurality of devices 391-393. Optical sensing system 300 includes an illumination unit 310 that emits a series of light pulses 315. These are emitted over a range of azimuths and elevations, denoted with the shaded cone in FIG. 3, such that they illuminate various devices 391-393. Unlike light pulses 215 shown in FIG. 2, the light pulses 315 can comprise active durations (or periods), during which illumination unit 310 emits optical energy (e.g., at an infrared wavelength). Two active durations 315a and 315c are shown. The light pulses 315 can also include one or more inactive durations, intermittent between the active durations, during which illumination unit 310 does not emit optical energy. One inactive duration 315b is shown for purposes of illustration. As denoted by the bracket underlying the pulses, FIG. 3 illustrates the operation of the optical system during active period 315a, e.g., for ToF measurement.

Similar to the devices shown in FIG. 1-2, each of devices 391-393 includes an optical reflector capable of reflecting at least a portion of all incident optical signals. As such, each of devices 391-393 reflects light pulses 315, during active periods 315a and 315c, such that the reflections are incident on lens 340, which is configured to project the reflected light pulses on an image sensor 330. Since the devices 391-393 are at different positions relative to light pulses 315, the reflected light pulses will appear at different pixels within the pixel array comprising image sensor 330. The timing of the active and inactive durations of the light pulses is under control of ToF measurement and position determination circuit 320 (e.g., via PSU 325) which operates during active periods in manner substantially similar to circuit 220 described above with respect to FIG. 2. As such, the ToF measurement and position determination operations of optical sensor 320 during active periods 315a and 315c will not be described further.

In addition, each of devices 391-393 comprises an optical transceiver, labeled 391a-393a, respectively. Each optical transceiver can include an optical transmitter configured to emit an optical signal having a wavelength substantially similar to the wavelength of light pulses 315 (e.g., an infrared wavelength). Each optical transceiver 391a-393a can also include an optical detector (e.g., a photodiode) configured to determine and/or detect the active and inactive durations of light pulses 315. In addition, each optical detector can be configured to inhibit its associated optical transmitter from emitting an optical signal during the detected active durations of light pulses 315 (e.g., 315a and 315c). In addition, each optical detector can be configured to enable its associated optical transmitter to emit an optical signal during the detected inactive durations of light pulses 315 (e.g., 315b).

In some embodiments, each optical transceiver 391a-393a can also include an optical receiver configured to receive information transmitted by the optical sensing system 300. For example, the information can be related to the active and/or inactive durations of the light pulses 315, and/or can include an identifier of the dual-mode optical device.

Figure 4:
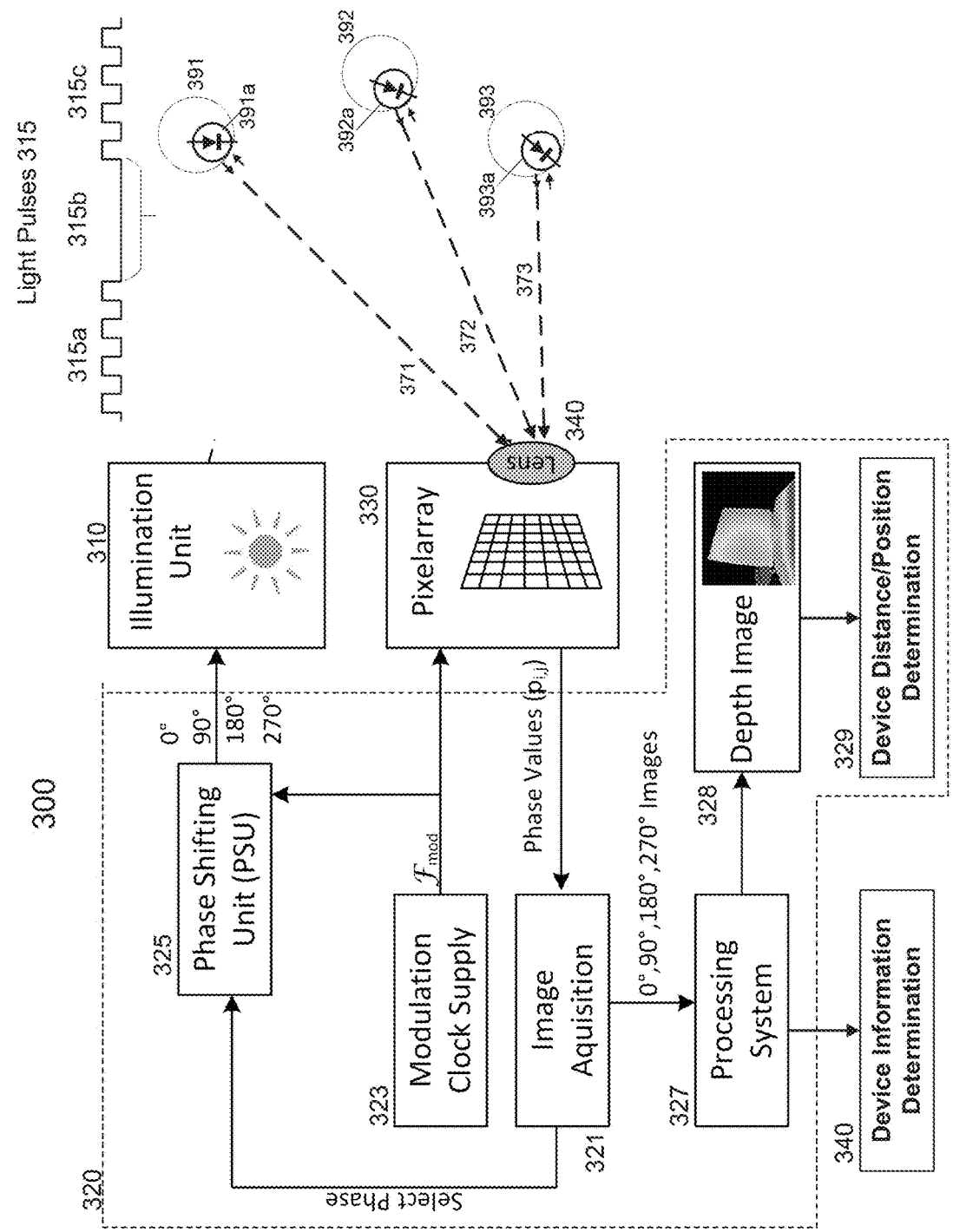

These operations are further explained with reference to FIG. 4, which illustrates the operation of the exemplary optical system during inactive period 315b, e.g., for information transfer from an optical device to the optical sensing system. In some embodiments, using respective optical transceivers 391a-391c, each optical device 391-393 can detect the onset of inactive duration 315b and enable its optical transmitter to transmit an information-bearing optical signal that can be received by optical sensing system 300 via lens 340 and image sensor 330. For example, the information can be used to modulate the phase of the optical signal using n-ary phase-shift keying (PSK) modulation (or a variant thereof) such that m=$\log_2$ n information bits can be encoded into each modulating symbol. Depending on the distance and the particular configuration of the optical devices, the optical sensing system can detect one or more of signals 371-373 transmitted during inactive period 315b. For example, the received optical beam widths of signals 371-373 can be narrow enough that they can be differentiated on the pixel array comprising image sensor 330.

In this manner, image acquisition circuit 321 captures the pixel signals from image sensor 330 during inactive period 315b in a similar manner as during active period 315a, and sends these images to processing circuit 327 and, ultimately, to device information determination circuit 340. This circuit can be configured to retrieve, for instance by demodulating, the information encoded in one or more of optical signals 371-373. For example, in the case of a phase-modulated signal, image acquisition circuit 321 can control illumination unit 310 and image sensor 330 to capture a plurality of images, such that the information can be retrieved from the captured plurality of images by the cooperative operation of processing system 327 and device information determination circuit 340. In other words, multiple images can be captured and used to retrieve each information bit encoded within signals 371-373. The number of required images per bit can depend on the type of modulation used.

Figure 5:
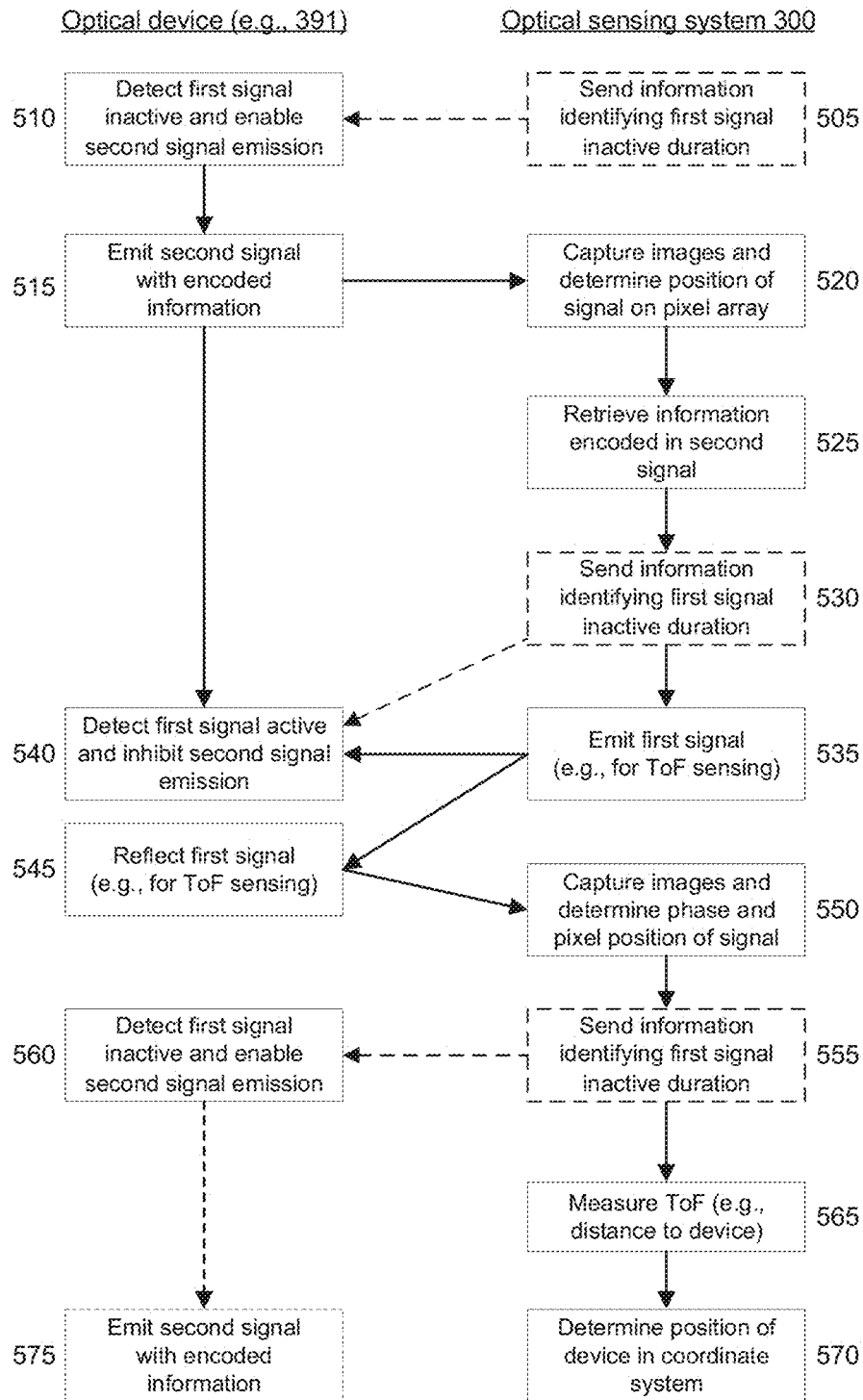
FIG. 5 is a flow diagram that further illustrates operations of optical devices and an optical sensing system shown in FIGS. 3-4.

FIG. 5 is a flow diagram that further illustrates the operations of optical devices 391-393 and optical sensing system 300 described above in relation to FIGS. 3-4. Each block in FIG. 5 is associated with a particular operation performed by one of these peers. In other words, the operations of one or more of the blocks associated with a particular peer (e.g., optical device) can comprise a method and/or procedure performed by that particular peer. Furthermore, although FIG. 5 shows blocks in a particular order, this order is merely exemplary, and the operations can be performed in a different order than shown in FIG. 5 and can be combined and/or divided into blocks having different functionality. Blocks comprising optional operations are shown using dashed lines.

In some embodiments the operations include block 505, in which the optical sensing system (OSS for short) can send information identifying an inactive duration of the signal emitted for the purposes of ToF measurement (referred to as "first signal" or "first optical signal"). For example, the OSS can send such information in an optical signal or a RF signal. In some embodiments, another device (e.g., an AR or VR device) incorporating the OSS can send an RF signal comprising such information. In such case, the operations of block 510 can include the optical device receiving the signal comprising such information, from which it can detect that the first signal is inactive and, consequently, enable transmission of the optical signal used to convey information (referred to as "second signa" or "second optical signal"). In some embodiments, the information sent in block 505 can include an identifier of a particular optical device, e.g., to indicate that the particular optical device is allowed to transmit during the inactive period.

In other embodiments that do not include the operations of block 505, the operations of block 510 can include the optical device detecting the onset of the inactive duration based on a lack of energy corresponding to the first optical signal. In either case, upon detecting the inactive duration, the optical device (e.g., a detector) enables the transmission of the second optical signal. Accordingly, in block 515, the optical device emits the second optical signal with encoded information, e.g., an information-bearing signal. For example, the information can include an identifier (ID) of the optical device encoded therein. In other embodiments, the second optical signal can include encoded information pertaining to a user interface (UI) of an object associated with the optical device. Such information can include, e.g., a universal resource locator (URL) or universal resource indicator (URI) that points to a location (e.g., on a server) where the UI can be obtained. In one embodiment, the information can include information pertaining to an operating parameter of the optical device, such as an intensity setting. In some embodiments, the information can be encoded based on phase-shift keying (PSK) modulation.

This signal is received by the OSS and in block 520, the OSS captures one or more images and determines position of the signal on the pixel array of its image sensor. Subsequently, in block 525, the OSS retrieves the information from the captured image(s). In some embodiments, such as when the operations of block 515 include encoding using PSK modulation, retrieving the information can include demodulating the PSK-encoded information. Such information can subsequently be used by the OSS to identify the device, one or more of its operating parameters, and/or a UI of the object associated with the device, or transmitted to another system to facilitate the same.

In some embodiments, the OSS operations also include block 530, where the OSS can send information identifying an active duration of the first optical signal. For example, block 530 can be included if corresponding block 505 (identifying an inactive duration) is also included.

Subsequently, in block 535, the OSS emits the first optical signal (i.e., the signal used for ToF measurement) during an active period. In block 540, the optical device detects that the first optical signal is in an active period and inhibits the emission of the second optical signal. If the operations of block 530 are included, the detection operation in block 540 can be based on receiving the information transmitted in block 530. In such case, the optical device can inhibit the emissions until subsequently receiving information identifying the next inactive duration. Otherwise, the detection operation in block 540 can be based the presence of energy corresponding to the first optical signal, and the optical device can inhibit the emissions until subsequently detecting a lack of energy corresponding to the first optical signal.

In either case, in block 545, the optical device reflects the first optical signal, and the reflections are received by the OSS. As discussed above, during the active period, the OSS can emit a plurality of light pulses (or groups of light pulses), each of which can be at a different phase. The operations of blocks 535 and 545 can include all of these emissions. Accordingly, in block 550, the OSS captures a plurality of images and determines a relative phase offset and pixel position of the reflected first optical signals. In block 565, based on the phase offset information, the OSS measures the ToF of the first optical signal, which corresponds to the distance to the device. In block 570, based on the determined pixel position and the ToF/distance, the OSS determines the position of the optical device in a coordinate system. This can include a position in a local coordinate system (e.g., of the optical device) and, optionally, a position in a world coordinate system.

In some embodiments, after completing the operations of blocks 535 and 550, in block 555 the OSS can optionally send information identifying the next inactive duration similar, e.g., to the optional operation of block 505. In block 560, similar to the complementary operation in block 540, the optical device can detect the onset of an inactive duration of the first optical signal, either by receiving the information sent by the OSS in block 555 or by detecting a lack of energy corresponding to the first optical signal. Based on this detection, the optical device can enable its optical transmitter to emit the second signal. Subsequently, and if desired and/or necessary, in block 575 the optical device can emit the second optical signal with encoded information, in a manner similar as described above with respect to block 515.

Figure 6:
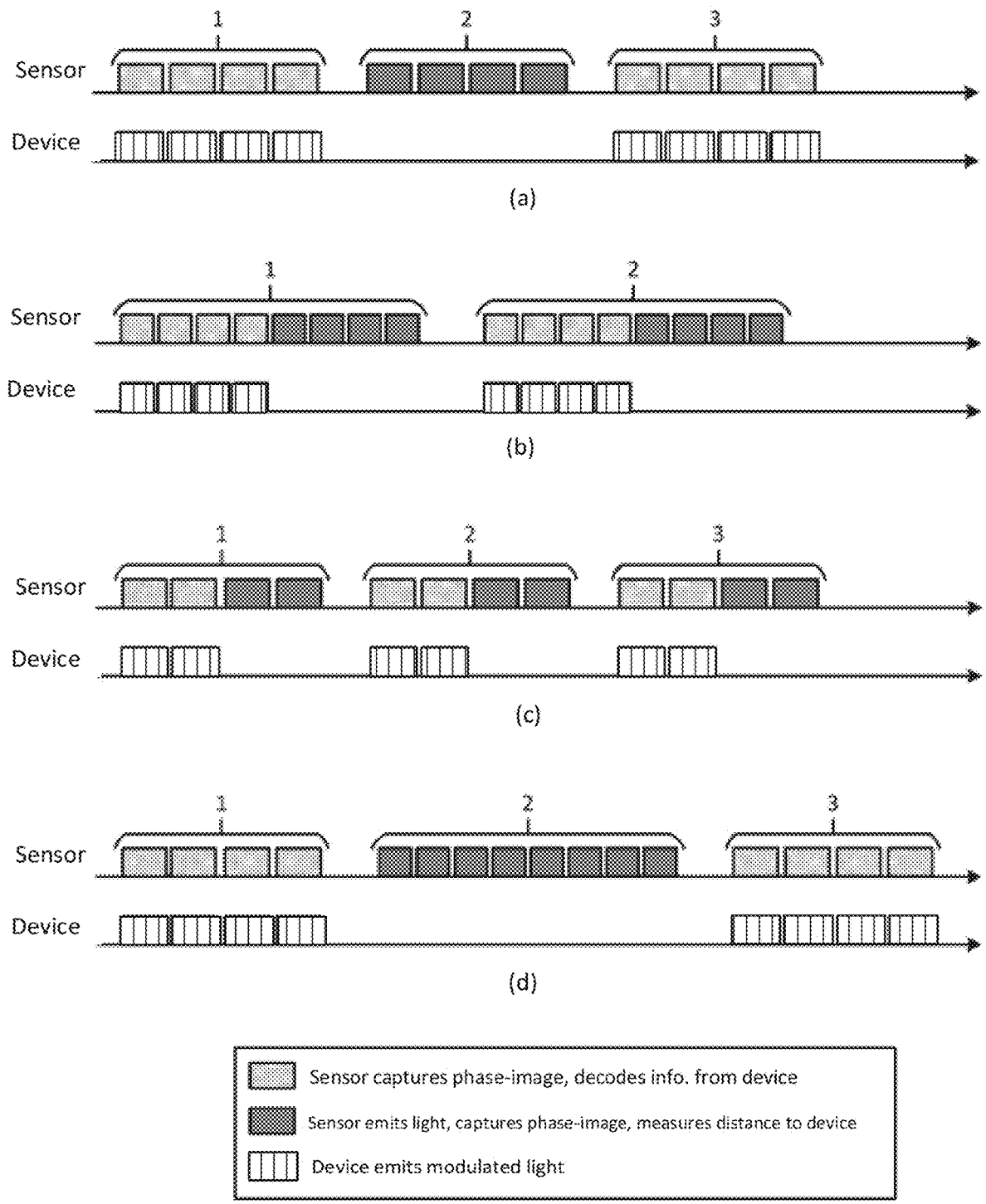
FIG. 6 illustrates time-multiplexed transmission and reception of two optical signals (e.g., signals having substantially similar wavelengths) between an optical sensing system and an optical device, according to various exemplary embodiments of the present disclosure.

FIG. 6 further illustrates the time-multiplexed transmission and reception of the two optical signals between the optical sensing system (or sensor) and optical device, according to various exemplary embodiments of the present disclosure. FIG. 6(a) illustrates an operation similar to that shown in FIGS. 3-4, in which the OSS emits a series of four phase-shifted light pulses ("first signal") during an active period (denoted as "2"), which are reflected by the optical device. The reflections are then used by the OSS to determine ToF/distance and device position, as discussed above. During intermittent inactive periods (denoted as "1" and "3"), the device emits the information-bearing ("second") signal. The OSS captures phase images of this signal and uses these to retrieve (e.g., decode and/or demodulate) the encoded information.

FIG. 6(b) illustrates a scenario that can be used for long distance measurements, such as 3D scanning. In this scenario eight (8) phase-images are used to create a single depth image. These eight images consist of two sets of four images, with each set at a different modulation frequencies. In other words, each set of images contains the complete information necessary to create a single depth image. As shown in FIG. 6(b), the optical device can transmit the information-bearing signal in intermittent inactive periods between the two four-image active periods.

FIG. 6(c) illustrates a scenario in which multiple the OSS captures multiple depth-image sets concurrently. For example, that can be used when distance measurements are not required to be very precise. Here, two light pulses with 90-degree offset are transmitted during each active period, and the optical device can transmit the information-bearing signal in intermittent inactive periods between the two-image active periods.

FIG. 6(d) illustrates a scenario usable for capturing multiple depth images concurrently, which can be particular useful for AR/VR applications. For example, there could be one stream of depth images with a higher update-rate (e.g., four-phase) and shorter range used for gesture detection, and another stream of depth images with a lower update-rate (e.g., eight-phase) and longer range for room scanning or obstacle detection. The optical device can detect first signals corresponding to both streams by either using the exposure times or number of phase-image per depth image. Based on this detection, the device can transmit information intermittent with one stream, and be silent for distance measurements in the other stream.

As discussed above, in order to derive the 3D position of the optical device in camera-centric coordinates, the OSS captures a depth image. As briefly discussed above with respect to FIG. 6, the depth image can be derived from any number of phase images between 1 and 8. These phase images can be captured using a single modulation frequency (such as in FIG. 6(a)) or using multiple modulation frequencies (such as in FIG. 6(b)).

Figure 7:
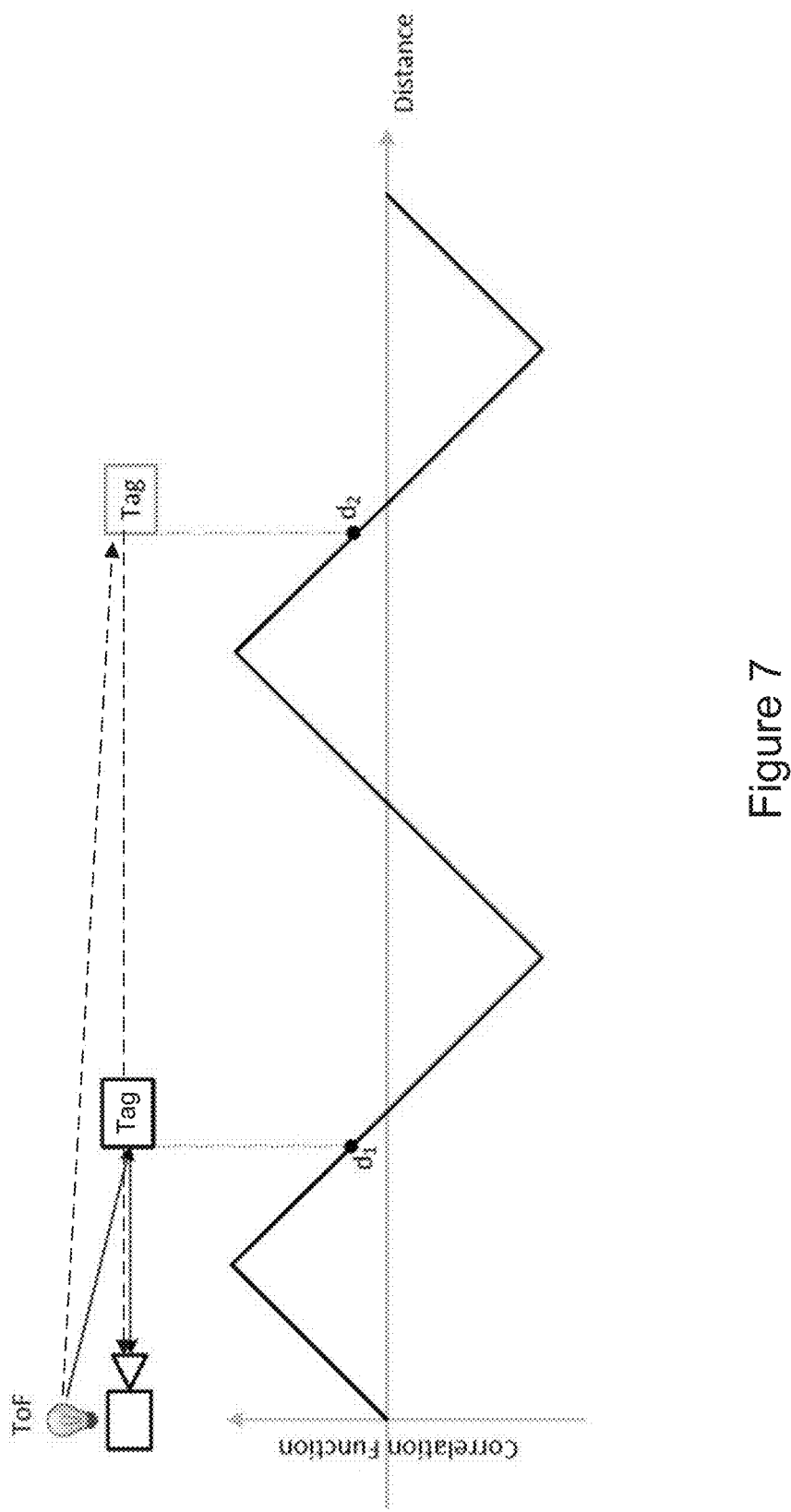
FIG. 7 illustrates an exemplary distance or phase ambiguity in a correlation function used for time-of-flight measurement.

ToF-based distance measurements are based on measuring the phase-shift of a "correlation function" which approximately represents a correlation between the phases of the emitted and reflected optical signals. The phase-shift of this function is proportional with the distance due to the travel time of the light pulses. However, the phase shift repeats at distances corresponding to multiples of $2\pi$ radians, such that single-frequency ToF measurements can be ambiguous with respect to the actual distance. This is illustrated by the arrangement shown in FIG. 7, which shows the correlation function having the same value for two devices ("tags") at different distances from the sensor. One possible solution, mentioned above, is to capture eight phase images, e.g., four each at two different modulation frequencies. As also mentioned above, however, this lowers the position update rate and may not be suitable for many applications.

Some exemplary embodiments of the present disclosure address these issues by the OSS determining a relative signal strength (e.g., intensity) of an incident signal from the optical device in the position determination. The signal can be one or both of the information-bearing signal transmitted by the optical device ("second optical signal") or the signal transmitted by the OSS and reflected by the optical device ("first optical signal"). If the OSS is aware of the device's reflective and/or emissive properties, the OSS can use the measured relative signal strength(s) to improve the position determination by eliminating, or at least reducing the likelihood of, ambiguities in the correlation function between the transmitted and the reflected versions of the first optical signal.

The OSS can be aware of the device's reflective and/or emissive properties in various ways. In some embodiments, an operating parameter of the optical device, such as an intensity setting, can be included in the information-bearing second optical signal. This operating parameter can represent, or can be used by the OSS to determine, the device's reflective and/or emissive properties. In other embodiments, the OSS can determine the device's properties from a device ID included in the information-bearing second optical signal. For example, after receiving the device ID, the OSS can use the received ID to reference stored information about the device's properties. The stored information can relate to the particular device transmitting the ID, or to a generic device type (e.g., model) that represents the particular device. The information can be stored locally (e.g., within the OSS) or remotely.

In some embodiments, the OSS can use information about its own emissive properties together with the device's reflective properties to determine the relative signal strength. For example, the OSS can learn the devices reflective properties by conducting one or more eight-phase reference measurements, then subsequently use that information in subsequent relative signal strength determinations. In other embodiments, a combination of the two above approaches can be used.

As mentioned above, various exemplary embodiments of the combined optical sensing system (OSS) and dual-mode (i.e., reflective and emissive) optical device can be utilized to facilitate user interaction in AR and VR applications. For example, if the optical device is associated with (e.g., attached to and/or co-located with) and object, various exemplary embodiments can facilitate interaction with the object via a user interface associated with the object.

Figure 8:
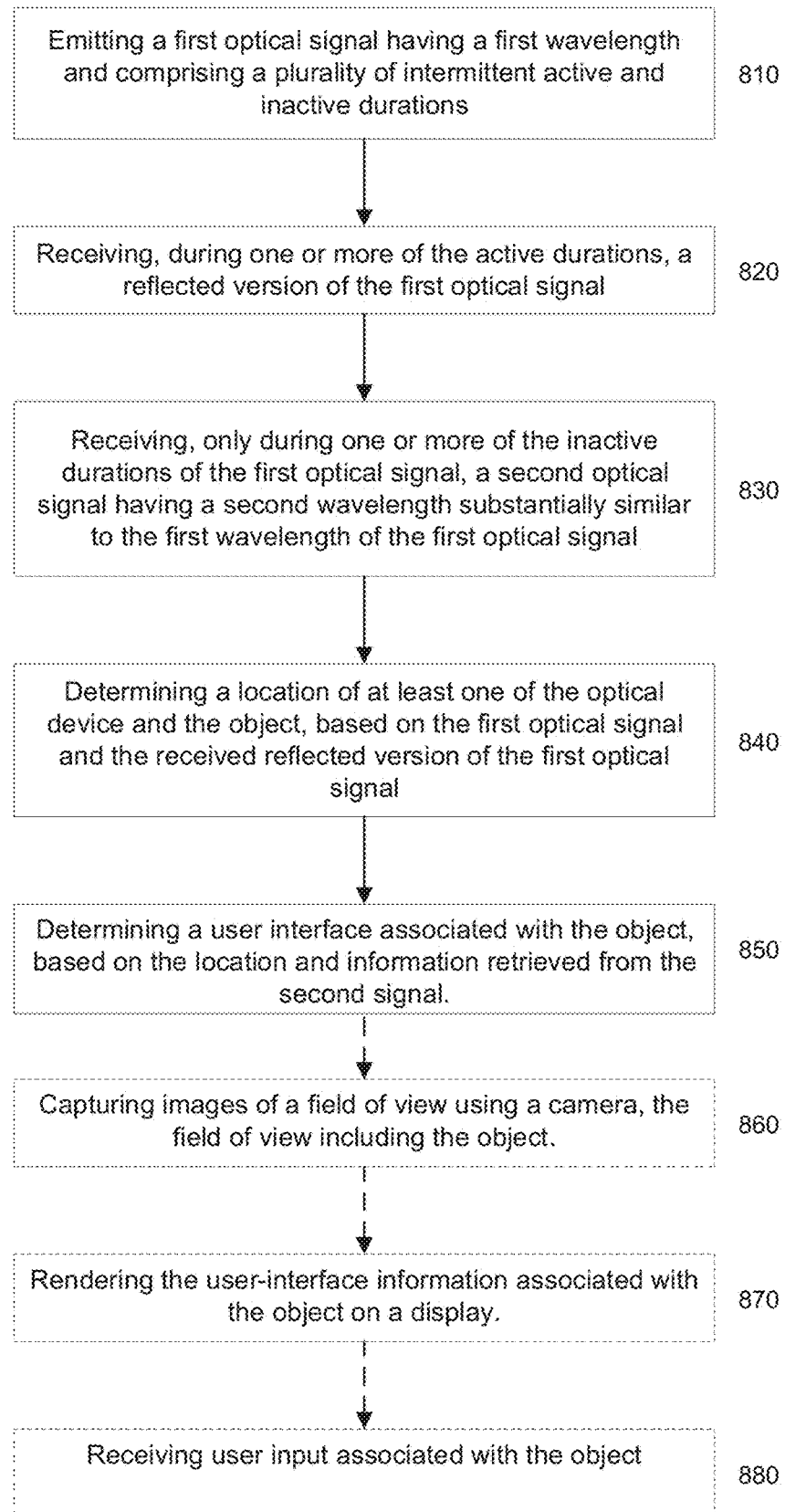
FIG. 8 is a flow diagram of an exemplary method and/or procedure for facilitating user interaction with an object associated with an optical device, according to various embodiments of the present disclosure.

FIG. 8 is a flow diagram of an exemplary method and/or procedure for facilitating user interaction with an object associated with an optical device, according to various embodiments of the present disclosure. Although the operations are described below as being performed by an optical sensing system (OSS), such as embodiments described above in relation to FIGS. 3-5, it should be understood that one or more of the operations comprising FIG. 8 can be performed by an AR/VR device comprising such OSS embodiments. Furthermore, although FIG. 8 shows blocks in a particular order, this order is merely exemplary, and the operations can be performed in a different order than shown in FIG. 8 and can be combined and/or divided into blocks having different functionality. Blocks comprising optional operations are shown using dashed lines.

The exemplary method and/or procedure shown in FIG. 8 can include the operation of block 810, in which the OSS emits a first optical signal having a first wavelength and comprising a plurality of intermittent active and inactive durations. The exemplary method and/or procedure shown in FIG. 8 can also include the operation of block 820, in which the OSS receives, during one or more of the active durations, a reflected version of the first optical signal. The exemplary method and/or procedure shown in FIG. 8 can also include the operation of block 830, in which the OSS receives, during one or more of the inactive durations, a second optical signal having a second wavelength substantially similar to the first wavelength of the first optical signal. For example, the first and second optical signals can have infrared wavelengths. The second optical signal can be an information-bearing signal, with the information encoded by the transmitting optical device using, e.g., PSK modulation.

The exemplary method and/or procedure shown in FIG. 8 can also include the operation of block 840, in which the OSS determines a location of at least one of the optical device and the object, based on the first optical signal and the received reflected version of the first optical signal. For example, this can be done by performing a time-of-flight (ToF) measurement based on the first optical signal and the reflected version of the first optical signal, and determining the location based on the ToF measurement.

The exemplary method and/or procedure shown in FIG. 8 can also include the operation of block 850, in which the OSS determines a user interface (UI) associated with the object, based on information included in the second optical signal. For example, this can be done by retrieving (e.g., demodulating and/or decoding) the information encoded within the second optical signal by the transmitting optical device. In some embodiments, retrieving the information can be done by demodulating information that was encoded using PSK modulation. This information can comprise elements of the UI itself (e.g., a Javascript), or an identifier for the optical device, the object, and/or the UI that can facilitate retrieval of the UI for the object. For example, the identifier can be a URL or a URI that facilitates retrieving the UI information from a record in a database that can be stored locally (e.g., on the OSS or the AR/VR device) or remotely (e.g., on a server).

In some embodiments, the UI associated with the object can also be determined based on the location of the object relative to the OSS. For example, there can be multiple UIs associated with an object, with the selection among the options based on the distance to the object. As such, a ToF measurement performed in block 840 can be used in determination of the UI associated with the object. Likewise, relative signal strength information can also be used in this determination, e.g., to reduce and/or eliminate the distance ambiguity in the correlation function described above in relation to FIG. 7.

Figure 9:
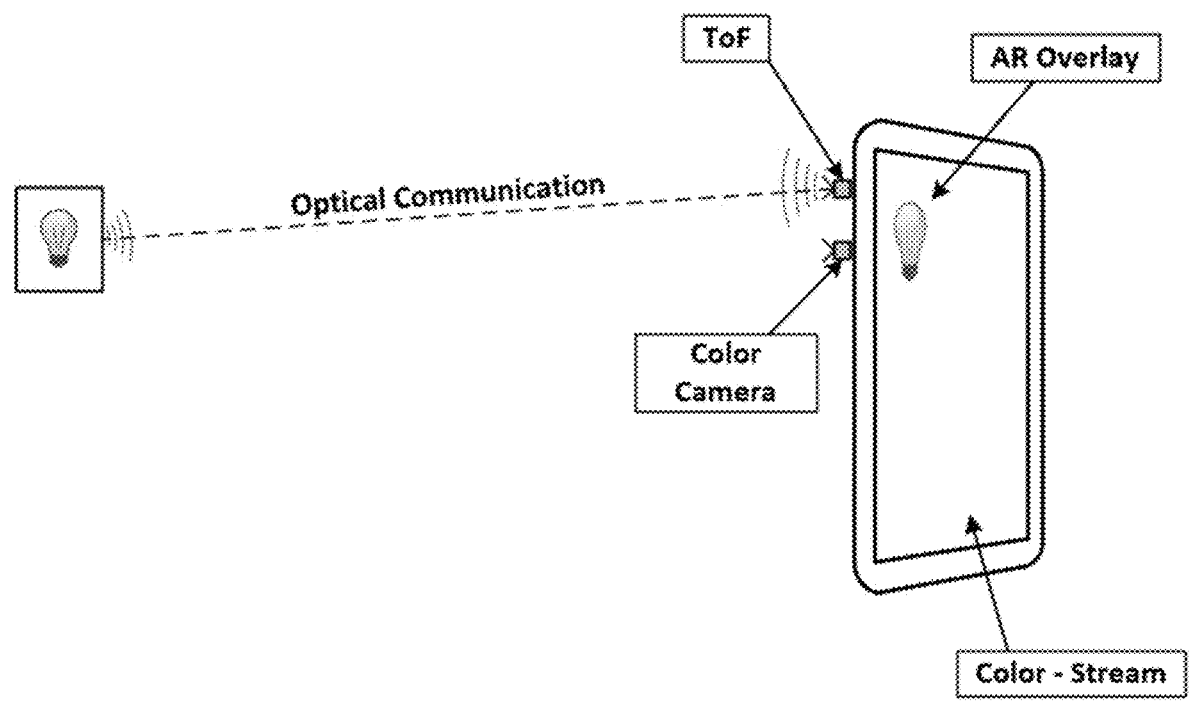
FIG. 9 shows an exemplary AR device (i.e., a smartphone or tablet device incorporating AR functionality) that incorporates an optical sensing system according to various embodiments of the present disclosure.

In some embodiments, the exemplary method and/or procedure shown in FIG. 8 can also include the operation of block 860, in which the AR/VR device comprising the OSS captures images of a field of view using a camera, with the field of view including the object. An exemplary system usable in this manner is illustrated in FIG. 9. More specifically, FIG. 9 shows an exemplary AR device (i.e., a smartphone or tablet device incorporating AR functionality) comprising a color camera, a display (e.g., color LCD or OLED), and an OSS (labelled "ToF") according to any of the various exemplary embodiments described above. The AR device is also capable of communicating with an optical device (associated with the light bulb shown in FIG. 9) for the purposes of ToF measurements and receiving information, as described above. The AR device is capable of providing viewfinder functionality in which an image stream from the color camera is shown on the display. For example, if the object is within the captured field of view, the AR device can show the object at a corresponding location on the display.

In such embodiments that include block 860, the exemplary method and/or procedure shown in FIG. 8 can also include the operation of block 870, in which the AR/VR device can render the UI information associated with the object on the display. In some embodiments, the UI information can be rendered together with the captured images on the display, e.g., in a region of the display corresponding to a position of the object in the field of view. For example, the UI information can be shown as overlapping with, or adjacent to, the object on the display.

Figure 10:
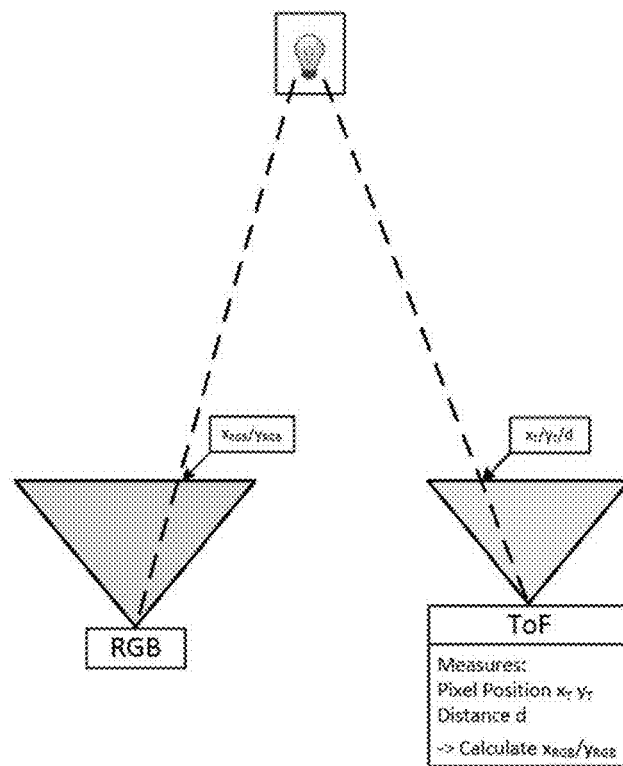
FIG. 10 illustrates an exemplary coordinate transformation between an object location determined via ToF measurement and a coordinate system of a color camera, such as included in the AR device shown in FIG. 9.

In some embodiments, rendering of the object and/or the UI information on the display can involve and/or require a geometrical transformation of OSS-centric position determined for the optical device into a coordinate system for the AR or VR device, here denoted $C_{AR}$ or $C_{VR}$. The particular transformation into $C_{AR}$ or $C_{VR}$ varies with the type of AR/VR device. In some embodiments, a VR device can utilize a 3D coordinate system by which a rendering engine place virtual objects over an augmented view. In the case of AR smartphones, such as shown in FIG. 9, $C_{AR}$ is the 2D coordinate space of the color camera. FIG. 10 illustrates an exemplary coordinate transformation between an object location determined via ToF measurement in OSS-centric coordinate system and a camera coordinate system, denoted RGB.

Figure 11:
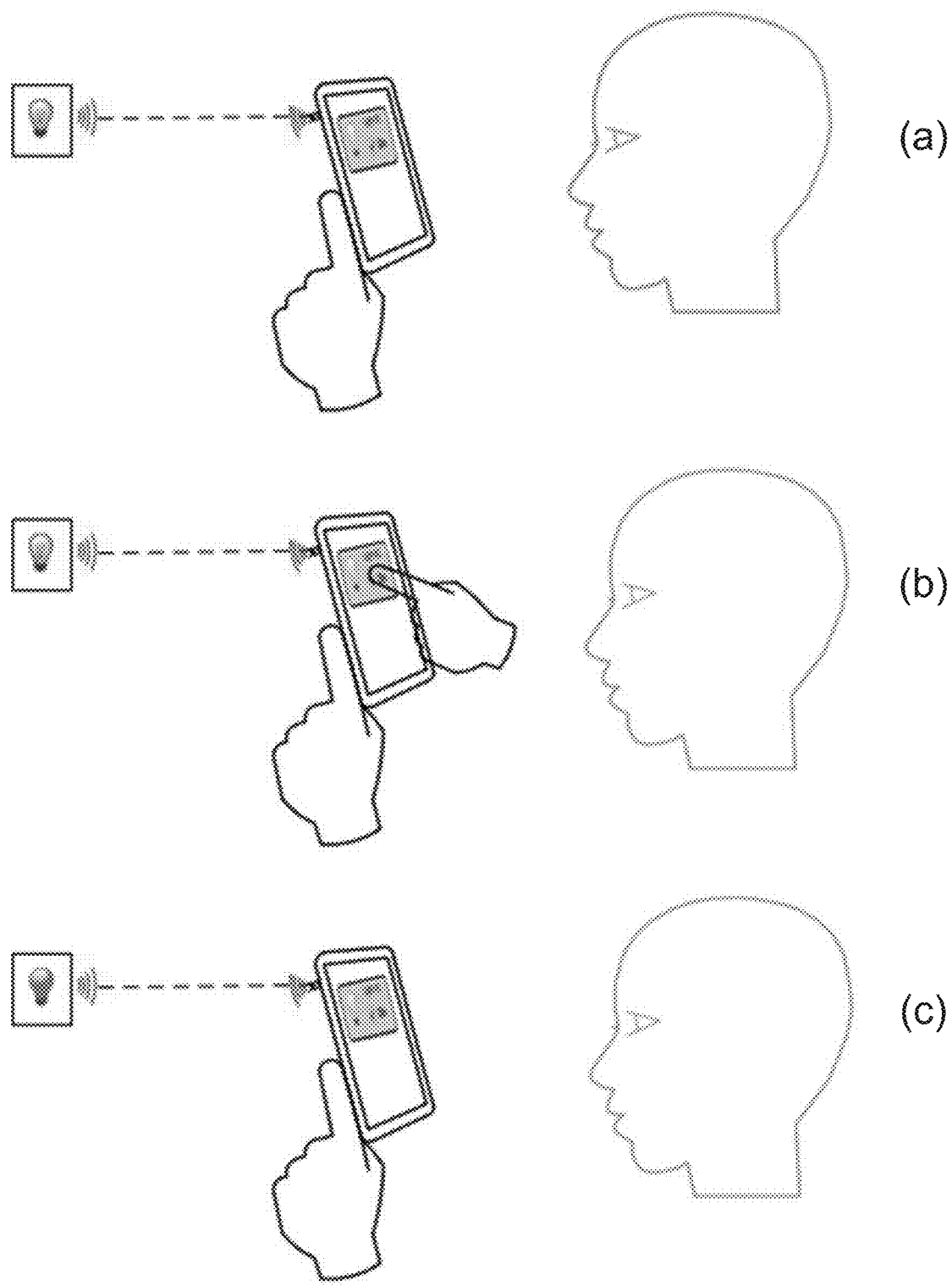
FIG. 11 illustrates various exemplary embodiments in which an exemplary AR device, such as shown in FIG. 9, is used to receive user input associated with an object.

In such embodiments that include block 870, the exemplary method and/or procedure shown in FIG. 8 can also include the operation of block 880, in which the AR/VR device can receive user input associated with the object. In some embodiments, the AR/VR device can also perform an action associated with the user input. FIG. 11 illustrates various exemplary embodiments in which a smartphone-type AR device, such as shown in FIG. 9, is used to receive user input associated with an object.

FIG. 11(a) shows the case where the object (e.g., the lightbulb) and a UI associated with the object are shown together on the display. FIG. 11(b) shows an embodiment in which the user touches a region of the display (e.g., a touchscreen display) in which the user-interface information was rendered. In this embodiment, the user input comprises a signal indicating the user touch in this region of the display. FIG. 11(c) shows an embodiment in which the user occludes a portion of the field of view of the camera (e.g., a portion corresponding to the region of the display in which the user-interface information was rendered). This occlusion can occur, e.g., by the user placing a finger within the field of view. In this embodiment, the user input can comprise a signal indicating detection of this occlusion. Alternately, if the user makes a recognizable gesture with a finger in the field of view, the user input can comprise a signal indicating detection of this gesture.

According to the examples shown in FIG. 11, an action associated with the user input (e.g., touch, gesture, or occlusion input) can include selecting a particular UI element that is touched on the display or occluded in the image stream shown on the display. Such selection can then trigger an action on the object, such as turning on or off the exemplary light bulb shown in FIG. 11. This can be done, for example, by sending a command to a light controller. For example, if the light controller is communicable with an optical device that includes an optical receiver, the command can be sent from the OSS to the optical device via an optical signal modulated with information representing the command. Alternately, such a command can be sent via a secondary communication link (e.g., an RF link) between the AR device and the light controller.

Figure 12:
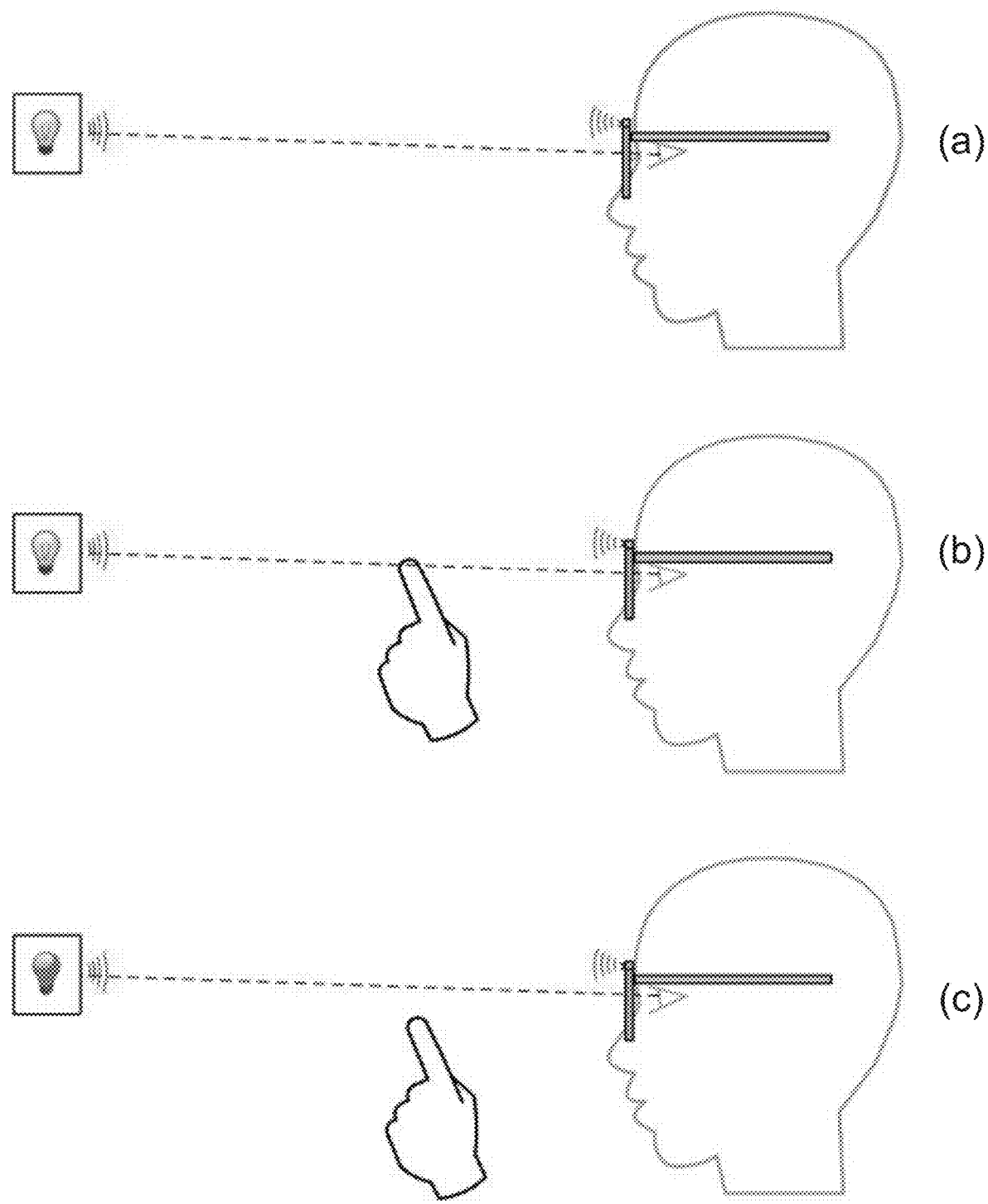
FIG. 12 illustrates various exemplary embodiments in which an exemplary head-mounted AR device (e.g., glasses) is used to receive user input associated with an object.

FIG. 12 illustrates various exemplary embodiments in which an exemplary head-mounted AR device (e.g., glasses) is used to receive user input associated with an object. The exemplary head-mounted AR device shown in FIG. 12 can incorporate any of the optical sensing system (OSS) embodiments described above. One difference from the smartphone-based embodiment shown in FIGS. 9 and 11 is that the UI information does not augment a video stream from a camera. Instead, the UI information can be rendered or shown, on one or more of the lenses, in a region corresponding to a position of the object in the user's field of view. Due to the stereoscopic nature of such devices, the object UI can be displayed in 3D. As such, the 3D position of the object can also be used to adjust the focus of the displayed UI information on devices which feature light field displays.

Various embodiments described above can also be incorporated into so-called "smart glasses," which generally refers to head-mounted devices that do not provide an AR overlay on the lenses (such as illustrated in FIG. 12), but rather include a small display on the side of the field of view. In such case, the UI information associate with the object can be shown on this small display, and the user can use gestures (e.g., occlusion, gesture, and/or gesture) to interact with the object via the UI elements.

Various embodiments described above can also be incorporated into various VR devices, such as VR goggles. In such embodiments, objects associated with an optical device at a location determined (e.g., by ToF measurements) in a physical coordinate system (e.g., an OSS-centric coordinate system and/or a world coordinate system) can be displayed at a location within a virtual 3D coordinate system that corresponds to the particular physical location. Various transformations known to skilled persons can be used for this mapping between coordinate systems. Embodiments of optical devices described herein can be used to mark other people, physical obstacles, computer input devices (e.g., mouse or keyboard), etc. In this manner, any of these can be displayed at a corresponding location in the virtual 3D coordinate system of the VR device.

Spatially relative terms such as "under", "below", "lower", "over", "upper" and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open-ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A dual-mode optical device, comprising:
    an optical reflector configured to reflect an incident first optical signal having a first wavelength within an infrared band, wherein the first optical signal comprises a plurality of intermittent active and inactive durations;
    an optical transmitter configured to emit a second optical signal having a second wavelength within the infrared band; and
    a detector configured to:
        determine the active and inactive durations of the first optical signal; and
        inhibit the optical transmitter from emitting the second optical signal during the detected active durations of the first optical signal.

2. The dual-mode optical device of claim 1, wherein the detector comprises an optical detector configured to detect energy of the first optical signal.

3. The dual-mode optical device of claim 1, wherein the detector comprises an optical detector configured to detect a transmission pattern of the first optical signal.

4. The dual-mode optical device of claim 1, wherein the detector comprises an optical detector configured to detect energy of the first optical signal and a transmission pattern of the first optical signal.

5. The dual-mode optical device of claim 1, further comprising a receiver configured to receive information identifying at least one of an active duration and an inactive duration of the first optical signal.

6. The dual-mode optical device of claim 5, wherein the receiver is one of an optical receiver and a radio frequency (RF) receiver.

7. The dual-mode optical device of claim 1, further comprising a receiver configured to receive information identifying an identifier of the dual-mode optical device.

8. The dual-mode optical device of claim 7, wherein the receiver is one of an optical receiver and a radio frequency (RF) receiver.

9. The dual-mode optical device of claim 1, wherein the optical transmitter is further configured to encode information in the second optical signal.

10. The dual-mode optical device of claim 9, wherein the information comprises an identifier (ID) of the optical device.

11. The dual-mode optical device of claim 9, wherein the information comprises information pertaining to an operating parameter of the optical device.

12. The dual-mode optical device of claim 9, wherein the information comprises information pertaining to a user interface (UI) of an object associated with the optical device.

13. The dual-mode optical device of claim 9, wherein the optical transmitter is configured to encode the information using phase-shift keying (PSK) modulation.

* * * * *